US012808322B2

(12) United States Patent
Verseux et al.

(10) Patent No.: US 12,808,322 B2
(45) Date of Patent: Nov. 24, 2026

(54) PROPULSION ASSEMBLY INTENDED FOR AN AIRCRAFT AND HAVING A HEAT EXCHANGE SYSTEM IN THE EXHAUST NOZZLE

(71) Applicant: Airbus Operations SAS, Toulouse (FR)

(72) Inventors: Olivier Verseux, Toulouse (FR); Nandakumar Devasigamani, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 17 days.

(21) Appl. No.: 18/911,368

(22) Filed: Oct. 10, 2024

(65) Prior Publication Data

US 2025/0122829 A1 Apr. 17, 2025

(30) Foreign Application Priority Data

Oct. 12, 2023 (FR) ....................................... 2310972

(51) Int. Cl.

*F02C 7/224* (2006.01)
*F02C 3/22* (2006.01)

(Continued)

(52) U.S. Cl.

CPC .................. *F02C 3/22* (2013.01); *F02C 7/18* (2013.01); *F02C 7/222* (2013.01); *F02C 7/224* (2013.01);

(Continued)

(58) Field of Classification Search

CPC ....................................................... F02C 7/224

See application file for complete search history.

(56) References Cited

U.S. PATENT DOCUMENTS

| | | | | | |
|---|---|---|---|---|---|
| 813,918 | A * | 2/1906 | Schmitz | F28D 7/103 | 428/596 |
| 3,237,401 | A * | 3/1966 | Peters | F02C 7/224 | 60/260 |

(Continued)

FOREIGN PATENT DOCUMENTS

| | | | |
|---|---|---|---|
| CN | 115930637 | A | 4/2023 |
| EP | 4116556 | A1 | 1/2023 |

(Continued)

OTHER PUBLICATIONS

French Search Report for corresponding French Patent Application No. 2310972 dated Apr. 8, 2024.

*Primary Examiner* — Devon C Kramer
*Assistant Examiner* — Marc Amar
(74) *Attorney, Agent, or Firm* — Greer, Burns & Crain, Ltd.

(57) ABSTRACT

A propulsion assembly having a combustion chamber and a fairing, an exhaust nozzle delimited by a nozzle wall, a dihydrogen tank, and a supply duct between the tank and the combustion chamber with a first portion between the tank and the nozzle wall, a second portion between the nozzle wall and the combustion chamber, and intermediate portions housed in the exhaust nozzle and wherein each intermediate portion has a first end, which is connected to the first portion through the nozzle wall, and a second end, which is connected to the second portion through the nozzle wall.

8 Claims, 2 Drawing Sheets

(51) Int. Cl.
*F02C 7/18* (2006.01)
*F02C 7/22* (2006.01)
*F02K 1/82* (2006.01)
*F28D 21/00* (2006.01)

(52) U.S. Cl.
CPC .......... *F02K 1/822* (2013.01); *F28D 21/0003* (2013.01)

(56) References Cited

U.S. PATENT DOCUMENTS 3,241,311 A * 3/1966 Kuhrt ........................ F02K 3/00 60/269
3,412,560 A 11/1968 Gaubatz
3,429,122 A * 2/1969 Pravada .................. F01D 5/181 60/487
3,734,639 A * 5/1973 Short ........................ F02C 7/12 416/193 A
3,740,949 A * 6/1973 Wolf ....................... F02C 7/224 60/768
4,744,412 A * 5/1988 Kim ........................ F28F 1/003 138/148
5,392,595 A * 2/1995 Glickstein ................. F02C 6/18 60/39.12
6,092,361 A * 7/2000 Romani .................... F02C 3/10 60/39.511
7,281,499 B2 * 10/2007 Franke .................... F22B 35/14 122/406.5
7,963,097 B2 * 6/2011 Mastronarde ......... F28F 9/0275 60/682
2011/0297357 A1 * 12/2011 Myers ..................... F02C 7/224 165/122
2011/0302928 A1 * 12/2011 Mudawar ................ F28F 1/022 60/782
2015/0000298 A1 * 1/2015 McAlister ................. F02C 7/16 60/39.12
2015/0007594 A1 * 1/2015 Laufer .................... F28D 7/106 62/113
2015/0300260 A1 * 10/2015 Wollenweber ............ F02C 9/40 60/39.12
2015/0337730 A1 11/2015 Kupiszewski et al.
2018/0363678 A1 * 12/2018 Kroger ...................... F02C 7/04
2020/0088098 A1 * 3/2020 Roberge .................... F02C 7/16
2020/0088099 A1 * 3/2020 Roberge .................. F02C 7/224
2020/0088102 A1 * 3/2020 Roberge .................. F02C 7/224
2021/0139160 A1 * 5/2021 Kool ...................... B64D 33/08
2023/0011956 A1 1/2023 Wiedenhoefer et al.
2023/0167770 A1 * 6/2023 Carretero Benignos . F02C 7/16 60/39.091
2023/0228455 A1 * 7/2023 Alessandrini ............. F24H 1/54 122/18.4
2024/0011440 A1 * 1/2024 Owoeye ................ F28D 20/021
2024/0067354 A1 * 2/2024 Czapla ...................... F02C 3/22
2025/0003368 A1 * 1/2025 Durocher .................. F02C 7/10

FOREIGN PATENT DOCUMENTS

EP 4166771 A1 4/2023
WO WO-9714875 A1 * 4/1997 .............. F02C 7/224
WO WO-2009031945 A2 * 3/2009 ............... B61C 5/00
WO 2014105327 A1 7/2014
WO WO-2024028552 A1 * 2/2024

* cited by examiner

PROPULSION ASSEMBLY INTENDED FOR AN AIRCRAFT AND HAVING A HEAT EXCHANGE SYSTEM IN THE EXHAUST NOZZLE

CROSS-REFERENCES TO RELATED APPLICATIONS

This application claims the benefit of French Patent Application Number 2310972 filed on Oct. 12, 2023, the entire disclosure of which is incorporated herein by way of reference.

FIELD OF THE INVENTION

The present invention relates to a propulsion assembly for an aircraft, said propulsion assembly comprising a propulsion system having an exhaust nozzle that ensures the discharge of the combustion gases from the propulsion system and a heat exchange system arranged in the exhaust nozzle for ensuring that heat energy is transferred to the dihydrogen supplying the propulsion system, and to an aircraft having at least one such propulsion system.

BACKGROUND OF THE INVENTION

In order to move, an aircraft conventionally has at least one propulsion assembly comprising a propulsion system that is arranged in a nacelle and may take the form of a jet engine or a turboprop engine. In each case, the propulsion system has a rotary assembly that drives a fan or a propeller. The rotary assembly constitutes a core of the propulsion system and, from the front to the rear, it has an air inlet, which allows the introduction of air into a duct of the core, a compressor, which compresses the air thus introduced, a combustion chamber in which the air thus compressed and a fuel are mixed, and a turbine, which allows the combustion gases to expand and which generates the rotation that is transmitted to the fan or to the propeller.

Downstream of the turbine, an exhaust nozzle ensures the discharge of the combustion gases.

It is also known, in particular in the case of dihydrogen, that the efficiency of the combustion of a fuel is improved if this fuel is heated before said combustion. It is also known to use some of the hot combustion gases discharged by the exhaust nozzle to heat the fuel.

SUMMARY OF THE INVENTION

An object of the present invention is to propose another solution for heating the dihydrogen before its combustion in complete safety.

To that end, a propulsion assembly for an aircraft is proposed, having:

- a propulsion system comprising a fairing, a rotary assembly having a combustion chamber and housed in the fairing, an exhaust nozzle arranged downstream of the combustion chamber and delimited by a rear portion of the fairing, referred to as nozzle wall, and ensuring the discharge of the combustion gases originating from the combustion of the dihydrogen in the combustion chamber,
- a dihydrogen tank, and
- a supply duct, which connects the tank to the combustion chamber and which has a first portion, which extends between the tank and the nozzle wall, a second portion, which extends between the nozzle wall and the combustion chamber, and a plurality of intermediate portions housed inside the exhaust nozzle and wherein each portion has a first end, which is fluidically connected to the first portion through the nozzle wall, and a second end, which is fluidically connected to the second portion through the nozzle wall.

With such an arrangement, the heat energy of the combustion gases is transferred to the dihydrogen by virtue of the intermediate portions that pass through the nozzle.

Advantageously, each intermediate portion extends over an angular sector about a longitudinal axis of the exhaust nozzle.

Advantageously, there are a plurality of intermediate portions in succession along the longitudinal axis of the exhaust nozzle.

Advantageously, the intermediate portions arranged in succession are spaced apart from one another.

Advantageously, the supply duct is a double-walled duct with an inner wall delimiting an inner volume in which the dihydrogen circulates and an outer wall delimiting an outer volume.

Advantageously, the outer volume is evacuated.

Advantageously, the supply duct has spacers fastened between the inner wall and the outer wall.

Advantageously, the outer surface of the supply duct is equipped with fins.

The invention also proposes an aircraft having at least one propulsion assembly according to one of the preceding variants.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
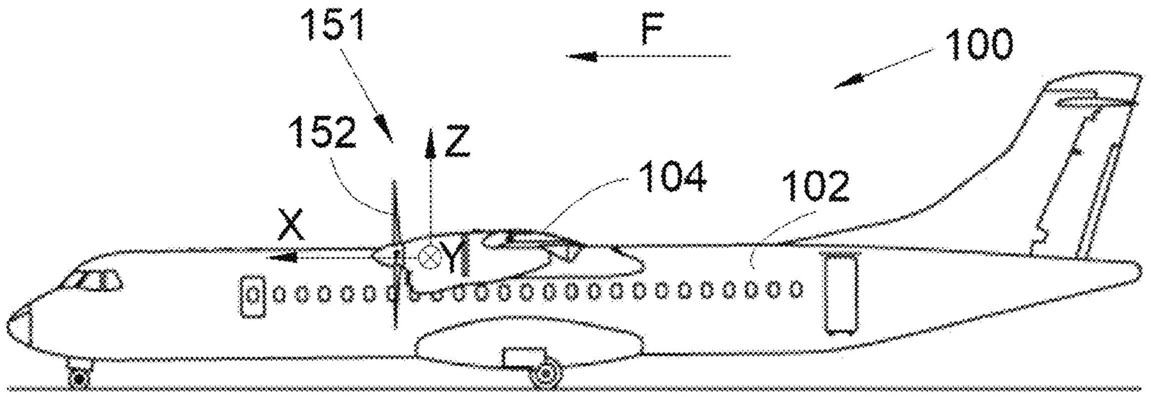
FIG. 1 is a side view of an aircraft having a propulsion assembly according to the invention.

In the following description, terms relating to a position are considered in relation to an aircraft in a position of forward movement, i.e., as shown in FIG. 1, in which the arrow F shows the direction of forward movement of the aircraft.

FIG. 1 shows an aircraft 100 that has a fuselage 102 on either side of which is fastened a wing 104. At least one propulsion assembly 151 is fastened under each wing 104.

Figure 2:
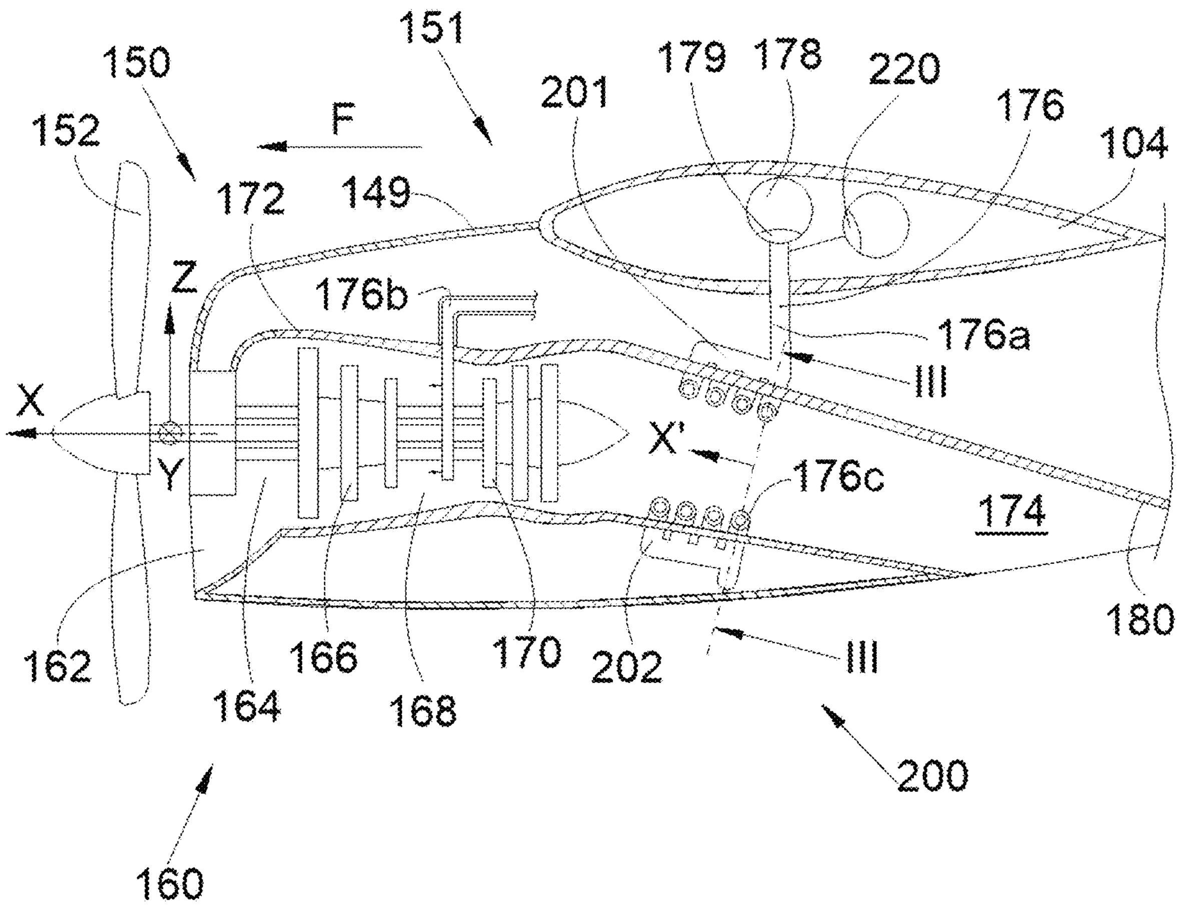
FIG. 2 is a schematic representation, in a side view and in section, of a propulsion assembly according to the invention.

FIG. 2 shows the propulsion assembly 151, which comprises a nacelle 149 and a propulsion system 150 surrounded by the nacelle 149. In the embodiment of the invention that is presented here, the propulsion system 150 takes the form of a turboprop engine with a propeller 152 driven in rotation by a rotary assembly mounted inside a fairing 172 of the propulsion system 150 housed inside the nacelle 149, but the propulsion system 150 may also take the form of a jet engine driving a fan. Thus, the propulsion system 150 generally has a rotary assembly and a movable element 152 (propeller or fan).

In the following description, and by convention, X denotes the longitudinal axis of the propulsion system 150, which corresponds to the axis of rotation of the movable element 152 with positive orientation in the direction of forward movement of the aircraft 100, Y denotes the transverse axis of the propulsion system 150, which is horizontal when the aircraft is on the ground, and Z denotes the vertical axis of the propulsion system 150 or vertical height when the aircraft is on the ground; these three axes X, Y and Z being mutually orthogonal.

FIG. 2 shows the propulsion system 150 in the case of a turboprop engine. A rotary assembly 160 constitutes a core of the propulsion system 150 and, from the front to the rear, has an air inlet 162, which allows the introduction of air into a duct 164 of the core, a compressor 166, which compresses the air thus introduced, a combustion chamber 168 in which the air thus compressed and dihydrogen are mixed and burned, and a turbine 170, which allows the combustion gases to expand and which generates the rotation that is transmitted to the movable element, in this instance the propeller 152. The elements of the rotary assembly 160 are surrounded by the fairing 172 formed of structural casings that are mounted around the elements of the rotary assembly 160 and make it possible to stiffen it, in order in particular to limit distortions thereof during operation.

The fairing 172 is, on the one hand, open to the front at the air inlet 162 and delimits the duct 164 and is, on the other hand, open to the rear at an exhaust nozzle 174, which is downstream of the turbine 170 and therefore of the combustion chamber 168 and ensures the discharge of the combustion gases originating from the combustion of the dihydrogen and the air in the combustion chamber 168. The rear part of the fairing 172 that surrounds the exhaust nozzle 174 forms the nozzle wall 180.

The space between the nacelle 149 and the fairing 172 is occupied by various systems that ensure the operation of the propulsion system 150. In particular, in order to supply dihydrogen to the combustion chamber 168, the propulsion assembly 151 has a dihydrogen tank 178, which in this instance is housed in the wing 104, a supply duct 176, which connects the tank 178 to the combustion chamber 168, and a pump 179, which moves the dihydrogen from the tank 178 to the combustion chamber 168 through the supply duct 176. Without departing from the scope of the invention, the dihydrogen tank 178 may also be housed in another part of the aircraft 100, for example in the fuselage 102.

In order to heat the dihydrogen before it is injected into the combustion chamber 168, so as to achieve better combustion, the propulsion assembly 151 also has a heat exchanger system 200, which is arranged in the exhaust nozzle 174 and which is arranged, when the propulsion system 150 is in operation, to ensure heat energy is exchanged between the hot combustion gases circulating in the exhaust nozzle 174 and the colder dihydrogen circulating in the supply duct 176.

The supply duct 176 has a first portion **176*a*, which extends between the tank 178 and the nozzle wall 180 and a second portion 176*b*, which extends between the nozzle wall 180 and the combustion chamber 168**.

In order to ensure that the dihydrogen circulating in the supply duct 176 is heated, the latter also has a plurality of intermediate portions **176*c* that are housed inside the exhaust nozzle 174, i.e. inside the volume delimited by the nozzle wall 180**.

Figure 3:
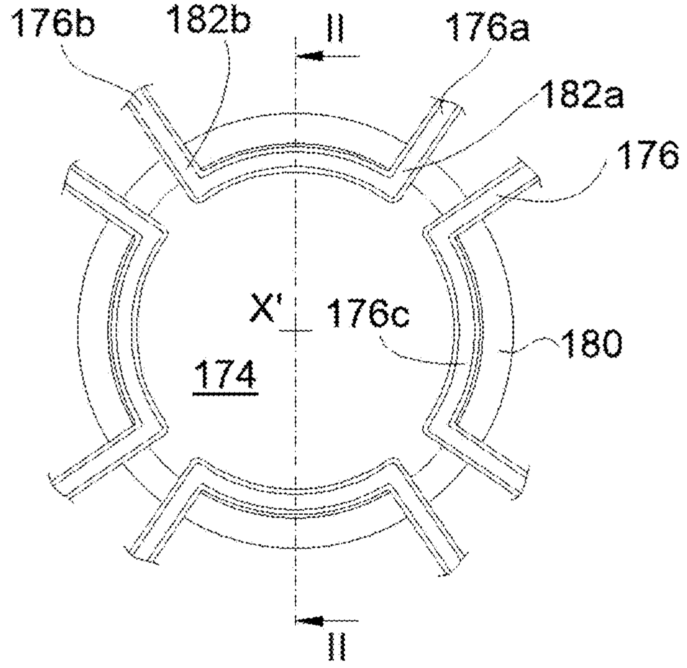
FIG. 3 is a view in section along the line III-III in FIG. 2.

FIG. 3 shows a section through the exhaust nozzle 174 at a plurality of intermediate portions **176*c*. Each intermediate portion 176*c* has a first end 182*a*, which is fluidically connected to the first portion 176*a* through the nozzle wall 180, and a second end 182*b*, which is fluidically connected to the second portion 176*b* through the nozzle wall 180. The intermediate portions 176*c* are thus housed in the exhaust nozzle 174 and are thus immersed in the combustion gases and thus the dihydrogen that circulates in the intermediate portions 176*c* is heated. The first portion 176*a* and the second portion 176*b* are arranged outside the exhaust nozzle 174**.

The various first ends **182*a* are thus all fluidically connected to the first portion 176*a* and the various second ends 182*b* are thus all fluidically connected to the second portion 176*b***.

This division into a plurality of intermediate portions **176*c* makes it possible to divide the supply duct 176 into a plurality of parts and thus to distribute the dihydrogen into these intermediate portions 176*c* instead of having a single longer portion inside the exhaust nozzle 174. Such an arrangement makes it possible, inter alia, to limit the forces that are applied to each intermediate portion 176*c*** compared to the forces that would be applied to a longer portion.

The first ends **182*a* and the first portion 176*a* are joined, for example, through an upstream manifold 201, and the second ends 182*b* and the second portion 176*b* are joined, for example, through a downstream manifold 202**.

In order to limit as much as possible the forces that are applied to the intermediate portions **176*c* while at the same time maximizing the heat exchange surface area, various intermediate portions 176*c* are distributed over the periphery of the exhaust nozzle 174**.

The exhaust nozzle 174 has a longitudinal axis X', which, depending on the arrangement of the nozzle wall 180, may or may not be parallel to the longitudinal axis X of the propulsion system 150.

Each intermediate portion **176*c* thus extends over an angular sector about the longitudinal axis X' of the exhaust nozzle 174. According to one particular embodiment, each intermediate portion 176*c* extends over an angle of between 40° and 50° and there are at least four intermediate portions 176*c*** distributed over the periphery.

In the same way, it is possible to distribute the dihydrogen over the length of the exhaust nozzle 174. According to one particular embodiment, there are a plurality of intermediate portions **176*c* that are arranged in succession along the longitudinal axis X' of the exhaust nozzle 174. In FIG. 2, there are four intermediate portions 176*c*** in succession.

In order to ensure that the heat transfer is as efficient as possible between the various intermediate portions **176*c* that are arranged in succession, these intermediate portions 176*c* are spaced apart from one another. Thus, there is a space between two successive intermediate portions 176*c*, thereby making it possible for the combustion gases to circulate between the intermediate portions 176*c***.

Figure 4:
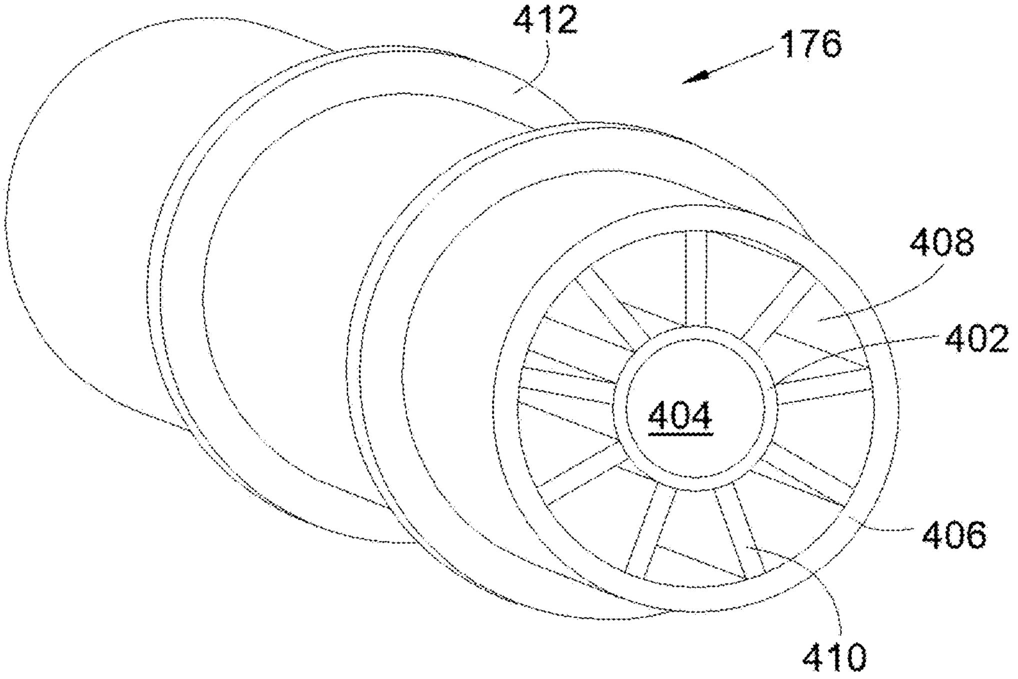
FIG. 4 is a perspective view of one particular embodiment of a supply duct implemented in the invention.

In addition, for safety reasons, and as is shown in FIG. 4, it is provided that the supply duct 176, i.e., the first portion **176*a*, the second portion 176*b* and each intermediate portion 176*c*, is a double-walled duct with an inner wall 402 delimiting an inner volume 404 in which the dihydrogen circulates and an outer wall 406 which is around the inner wall 402, and wherein an outer volume 408 not containing dihydrogen under normal operating conditions, i.e., when there is no leak, is delimited between the inner wall 402 and the outer wall 406**.

As a result, even if there is a leak at the inner wall 402, the dihydrogen will spread out in the outer volume 408 while remaining isolated from the hot combustion gases.

The outer volume is preferentially evacuated, thus if there is a leak at the outer wall 406, the outer volume 408 will fill with hot combustion gases while at the same time remaining isolated from the dihydrogen.

In order to prevent a dihydrogen leak at the intermediate portions 176*c*, the heat exchanger system 200 may have leak detection means and a control unit connected to the leak detection means. The heat exchanger system 200 also has a valve that is mounted on the first portion 176*a* and made to open and close by the control unit. The control unit makes the valve close when the leak detection means detect a dihydrogen leak at the inner wall 402 or the outer wall 406 of the intermediate portions 176*c*.

The leak detection means are for example pressure sensors arranged in the outer volume 408 and, since the pressure in the outer volume 408 is different to the pressure of dihydrogen in the inner volume 404 and to the pressure of the atmosphere outside the intermediate portions 176*c*, a leak from the inner wall 402 or from the outer wall 406 will be detected by the pressure sensors on account of the change in pressure in the outer volume 408.

When the outer volume is evacuated, the outer volume is for example fluidically connected to a vacuum pump 220.

In order to ensure that the outer wall 406 is correctly held around the inner wall 402, the supply duct 176 has spacers 410 fastened between the inner wall 402 and the outer wall 406 and therefore in the outer volume 408. In the embodiment of the invention that is presented here, each spacer 410 extends radially around the inner wall 402.

In order to improve the exchange of heat between the hot combustion gases and the dihydrogen, whether the supply duct 176 is single-walled or double-walled, the outer surface of the supply duct 176 is equipped with fins 412, which are produced from a material with high thermal conductivity and are integral with the outer surface. The fins 412 are thus immersed in the hot combustion gases.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:

a propulsion system comprising a fairing, a rotary assembly having a combustion chamber and housed in the fairing, an exhaust nozzle arranged downstream of the combustion chamber and delimited by a rear portion of the fairing, referred to as nozzle wall, and configured to ensure discharge of combustion gases originating from combustion of dihydrogen in the combustion chamber, a dihydrogen tank, and a supply duct, which connects the dihydrogen tank to the combustion chamber, the supply duct comprising:

a first portion extending between the tank and the nozzle wall;

a second portion extending between the nozzle wall and the combustion chamber; and a plurality of intermediate portions, each intermediate portion of the plurality of intermediate portions located within an exhaust chamber of the exhaust nozzle and passing through the nozzle wall, wherein a first end of each intermediate portion passes through the nozzle wall to connect with the first portion of the supply duct, wherein a second end of each intermediate portion passes though the nozzle wall to connect to the second portion of the supply duct, wherein the plurality of intermediate portions include sets of the plurality of intermediate portions and the intermediate portions of a respective set of the sets are angularly arranged about a longitudinal axis of the exhaust nozzle along a periphery of the exhaust nozzle within the exhaust nozzle, each intermediate portion of a respective set is angularly spaced from an adjacent intermediate portion of the respective set of intermediate portions, and wherein the sets of the intermediate portions are arranged in succession in a direction of the longitudinal axis of the exhaust nozzle.

2. The propulsion assembly according to claim 1, wherein the sets of intermediate portions in succession are spaced apart from one another.

3. The propulsion assembly according to claim 1, wherein the supply duct is a double-walled duct with an inner wall delimiting an inner volume in which the dihydrogen circulates and an outer wall delimiting an outer volume.

4. The propulsion assembly according to claim 3, wherein the outer volume is evacuated.

5. The propulsion assembly according to claim 3, wherein the supply duct comprises spacers fastened between the inner wall and the outer wall.

6. The propulsion assembly according to claim 1, wherein an outer surface of the supply duct is equipped with fins.

7. An aircraft comprising:

at least one propulsion assembly according to claim 1.

8. The propulsion assembly according to claim 1, wherein the first end of each intermediate portion is fluidically connected to the first portion of the supply duct through the nozzle wall by an upstream manifold located outside the exhaust nozzle, and the second end of each intermediate portion is fluidically connected to the second portion of the supply duct through the nozzle wall by a downstream manifold located outside the exhaust nozzle.

* * * * *